June 16, 1953 E. W. MILLER 2,641,968
GEAR SHAPING MACHINE WITH DISPLACEABLE APRON
Filed Sept. 16, 1948 10 Sheets-Sheet 1

Inventor
Edward W. Miller
by Wright, Brown, Quinby & May
Attys.

June 16, 1953 E. W. MILLER 2,641,968
GEAR SHAPING MACHINE WITH DISPLACEABLE APRON
Filed Sept. 16, 1948 10 Sheets-Sheet 4

Inventor
Edward W. Miller
by Wright, Brown, Quinby & May
Attys.

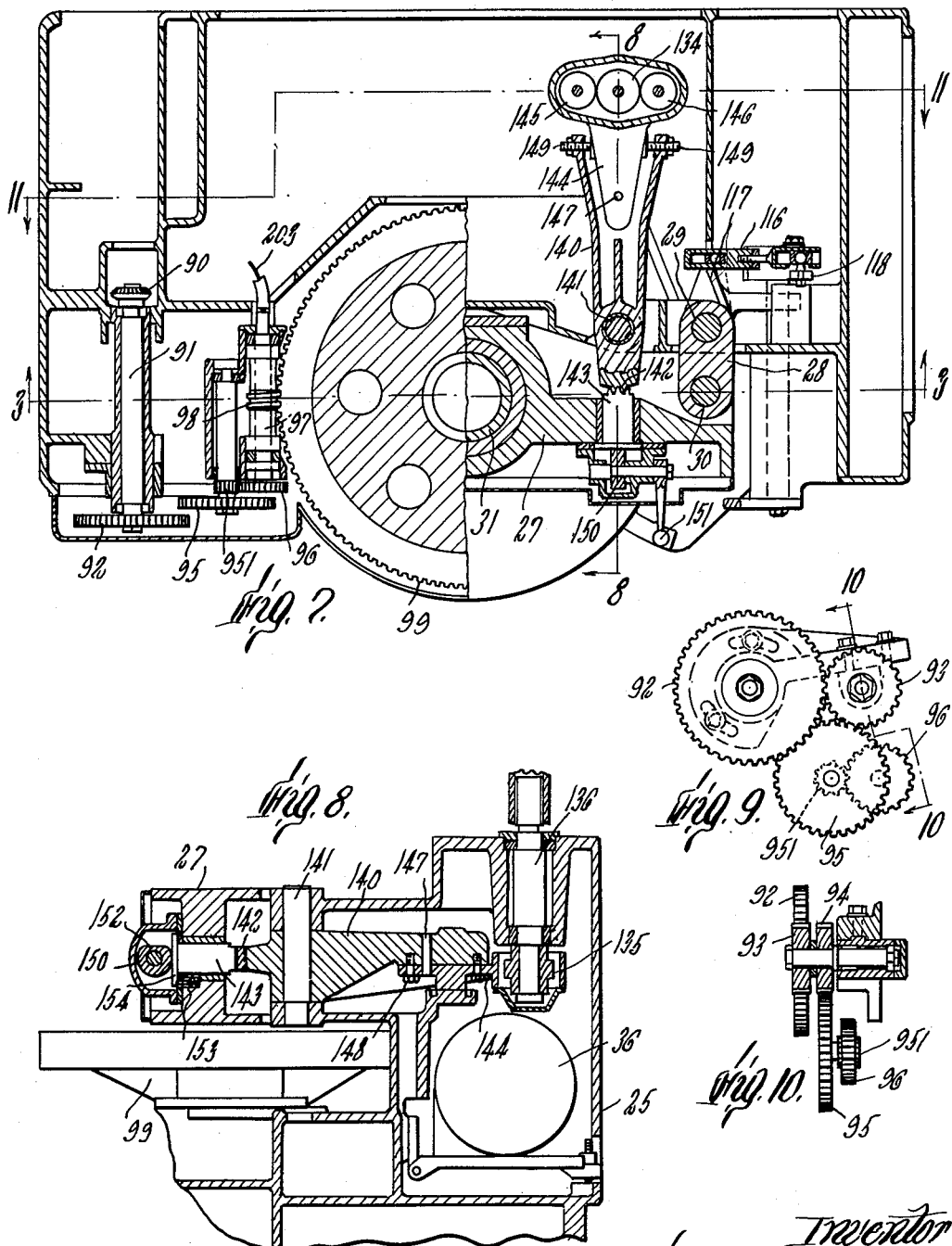

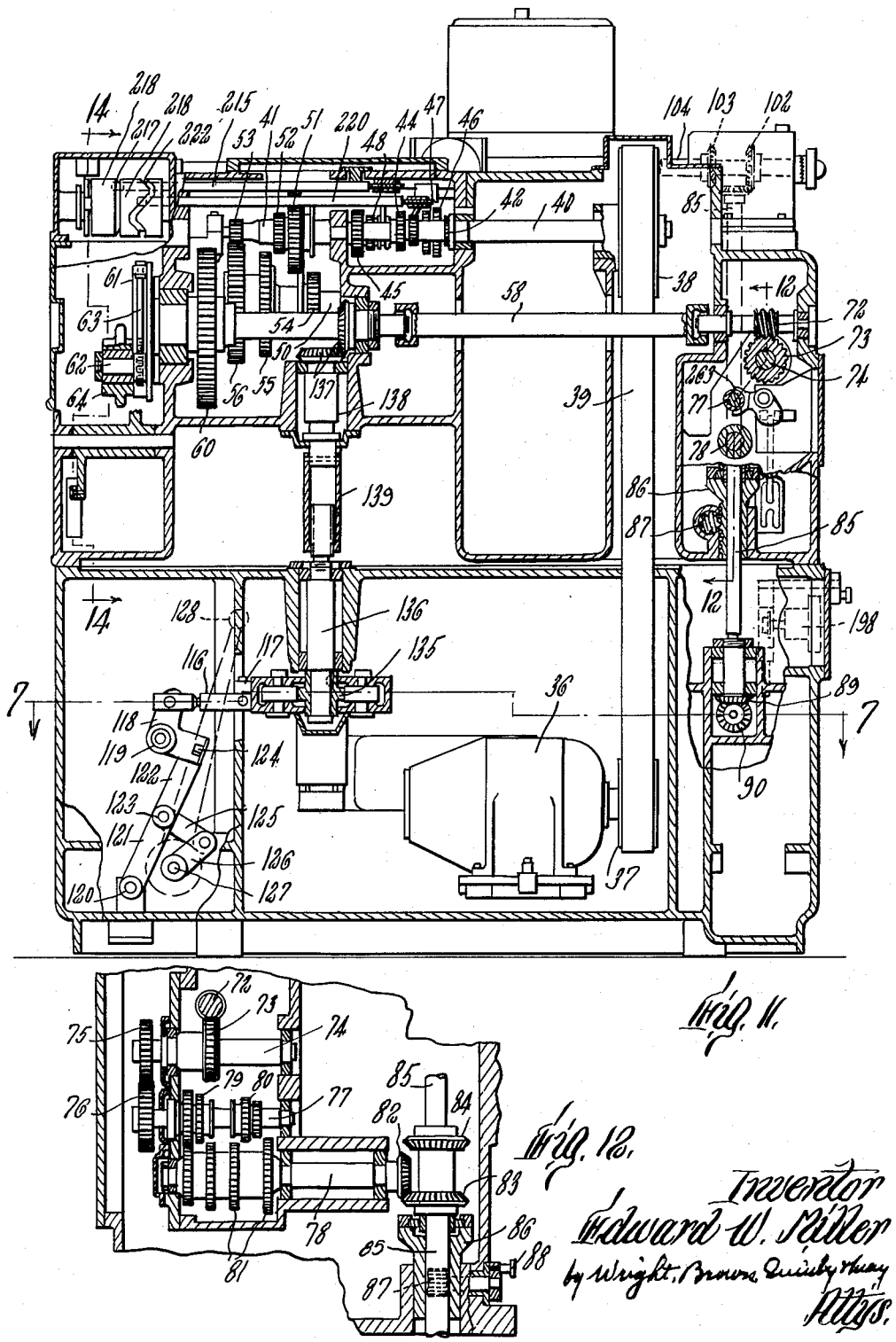

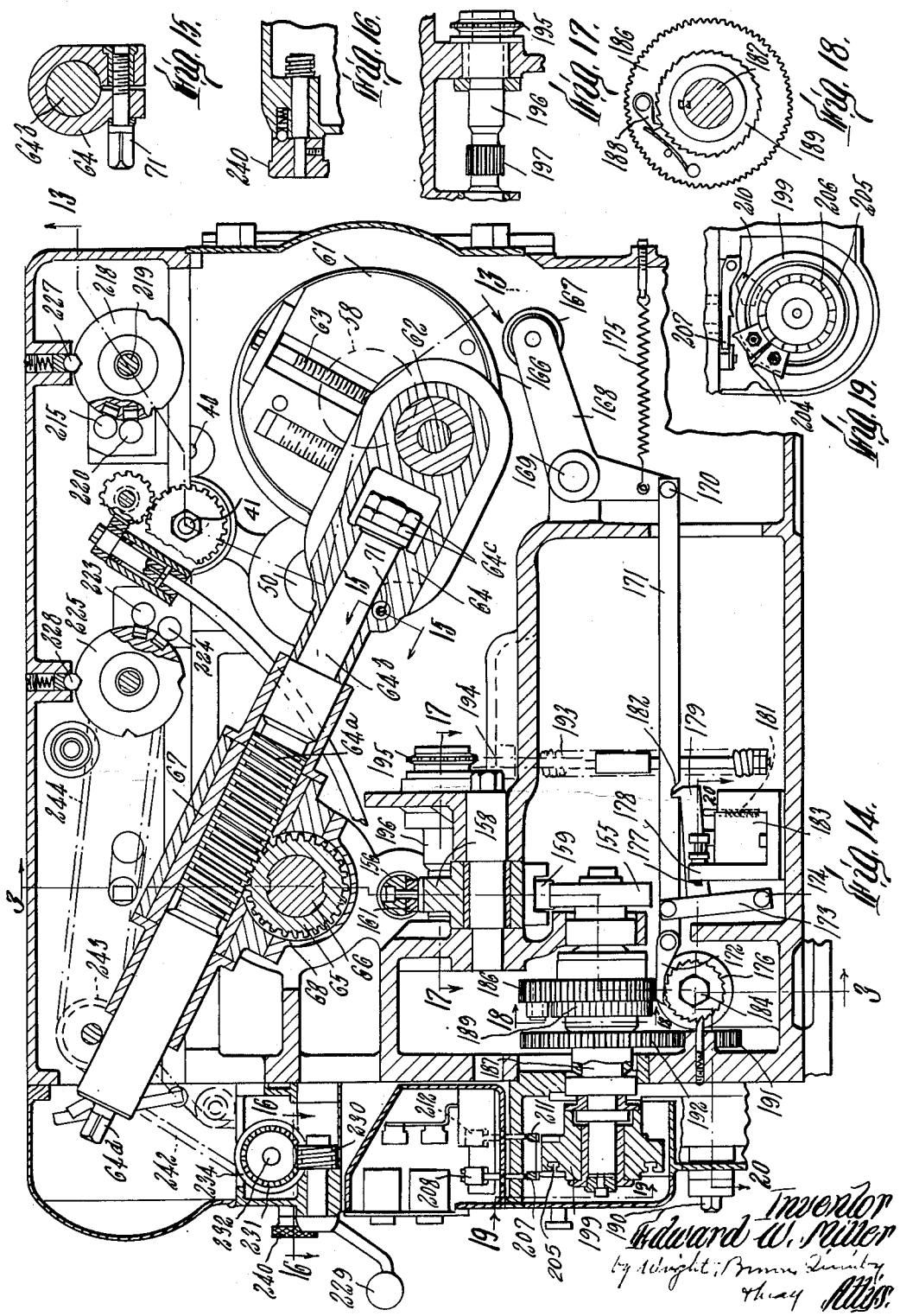

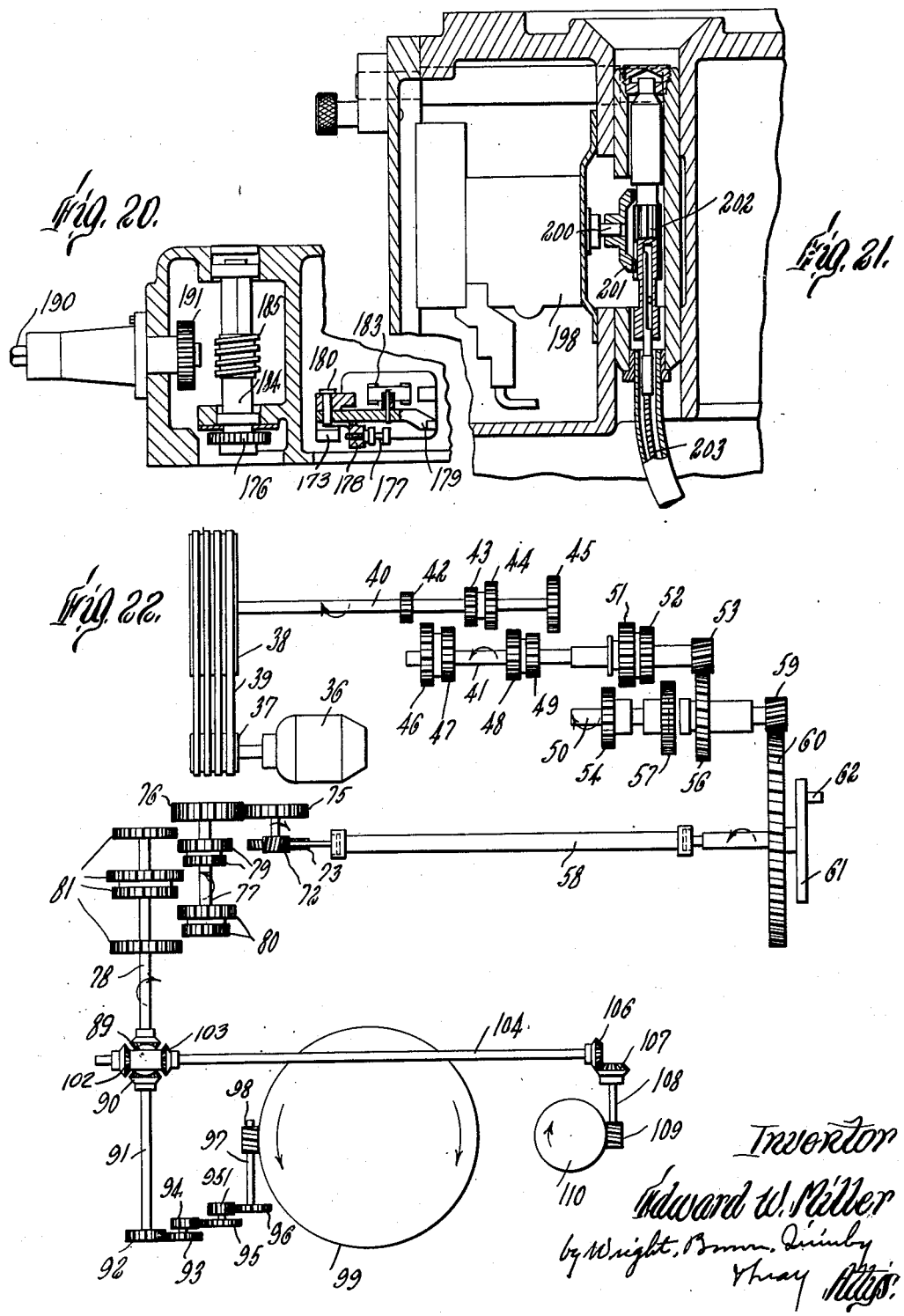

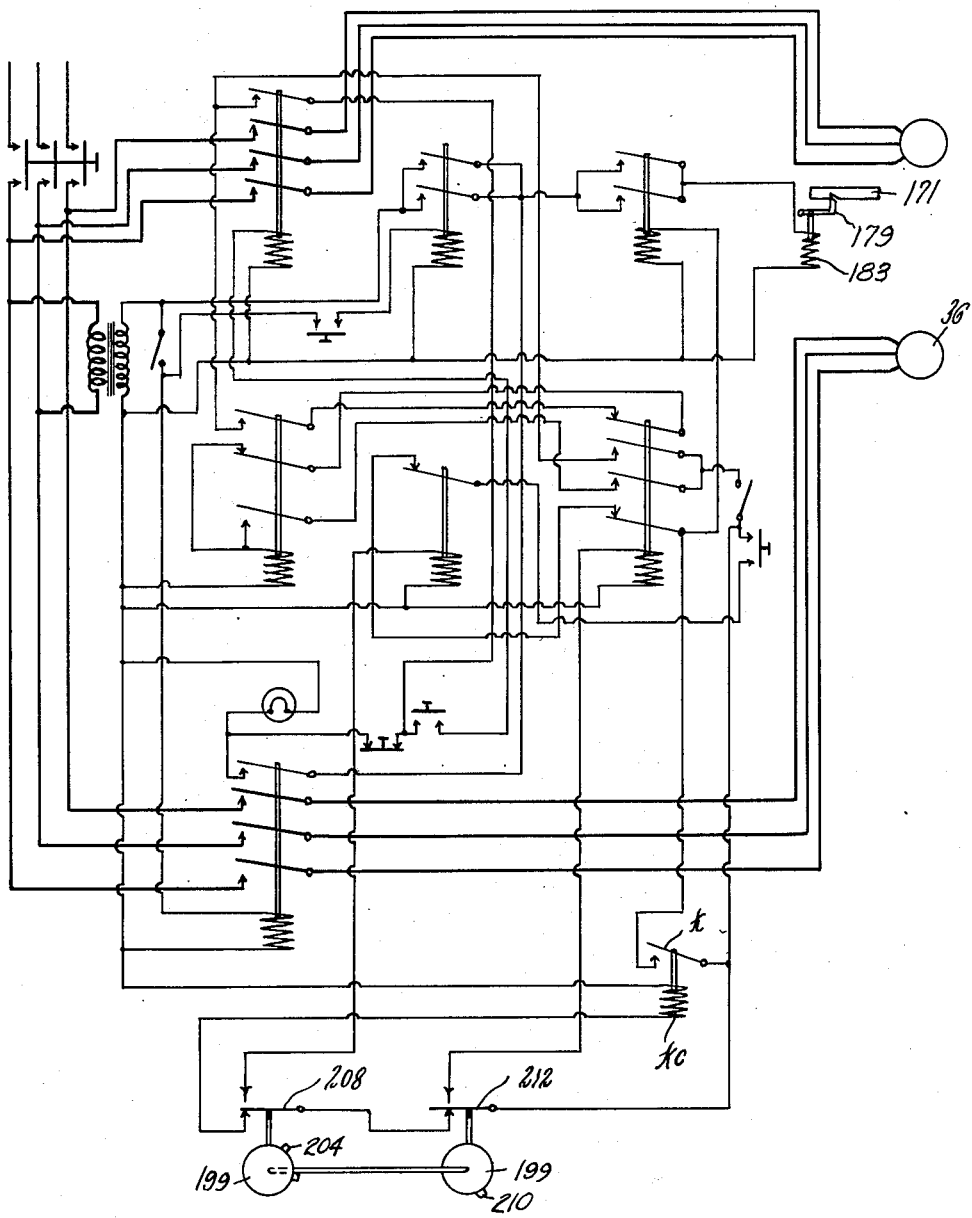

Patented June 16, 1953

2,641,968

UNITED STATES PATENT OFFICE 2,641,968

GEAR SHAPING MACHINE WITH DISPLACEABLE APRON

Edward W. Miller, Springfield, Vt., assignor to The Fellows Gear Shaper Company, Springfield, Vt., a corporation of Vermont Application September 16, 1948, Serial No. 49,531

12 Claims. (Cl. 90—7)

This invention relates to gear shaping machines of the well known type which perform their cutting action by means of a cutter having teeth similar to those of a gear or pinion, but provided with cutting edges at one end, and teeth are generated in a gear blank by conjoint movements of relative axial reciprocation between cutter and work piece and rotation about their respective axes. It is more particularly related to machines of this type capable of producing finished gears, either external or internal, and having either straight spur or helical teeth, of a wide range of diameters and face widths. Among the objects of the invention are the following:

To provide feeding means capable of causing such relative motions of approach between the cutter and work that the cutter teeth will penetrate into the work piece in a predetermined number of steps of predetermined length, with pauses between them while the cutting effect is being carried around the circumference of the work, all accomplished automatically, and including adjustable means whereby the number and lengths of such steps can be varied;

To provide a depth feed cam and novel mechanism for operating it so as to perform such steps of relative approach between cutter and work;

To provide, in connection with means for imparting cutting and return movements to the cutter, new and improved adjusting means for shifting the limits of such movements without affecting their length;

To provide a new and improved back off means for effecting separation betwen the work and cutter to prevent rubbing during the non cutting strokes of their relative reciprocation;

To provide a shiftable work holder and means for shifting and supporting it so that it can be moved clear of overhead structure to facilitate changing of large and heavy work pieces;

To provide in a machine of this type speed changing mechanisms by which a variety of different cutting speeds and different rotary feeds may be imparted, independently of one another, to cutter and work and, in connection therewith, means convenient to the operator of the machine for shifting such transmission mechanisms;

To provide an improved means for imparting rotation to the spindle which carries the cutter of such character that driving force is applied to the said spindle at the same side thereof as the engaging zone between the cutter and work piece, and obviate liability of distortion of the shaft by which power is transmitted to such means.

Illustrative embodiments of means for accomplishing the foregoing objects are described in the following specification, and shown in the accompanying drawings, in connection with a gear shaping machine of the type above designated; and the invention comprises the means thus shown and all equivalents thereof.

In the drawings—

Fig. 7 is a horizontal section taken on line 7—7 of Fig. 3 and Fig. 11;

Fig. 8 is a vertical cross section taken on line 8—8 of Fig. 7;

Fig. 9 is a front elevation of a set of change gears, partially shown in Fig. 7, by which rotation is transmitted to the work spindle;

Fig. 10 is a detail cross section on line 10—10 of Fig. 9;

Fig. 11 is a vertical section taken on line 11—11 of Fig. 5 viewed from the rear;

Fig. 12 is a vertical section taken on line 12—12 of Fig. 11;

Fig. 14 is a vertical section taken on line 14—14 of Figs. 2 and 3;

Figure 1:
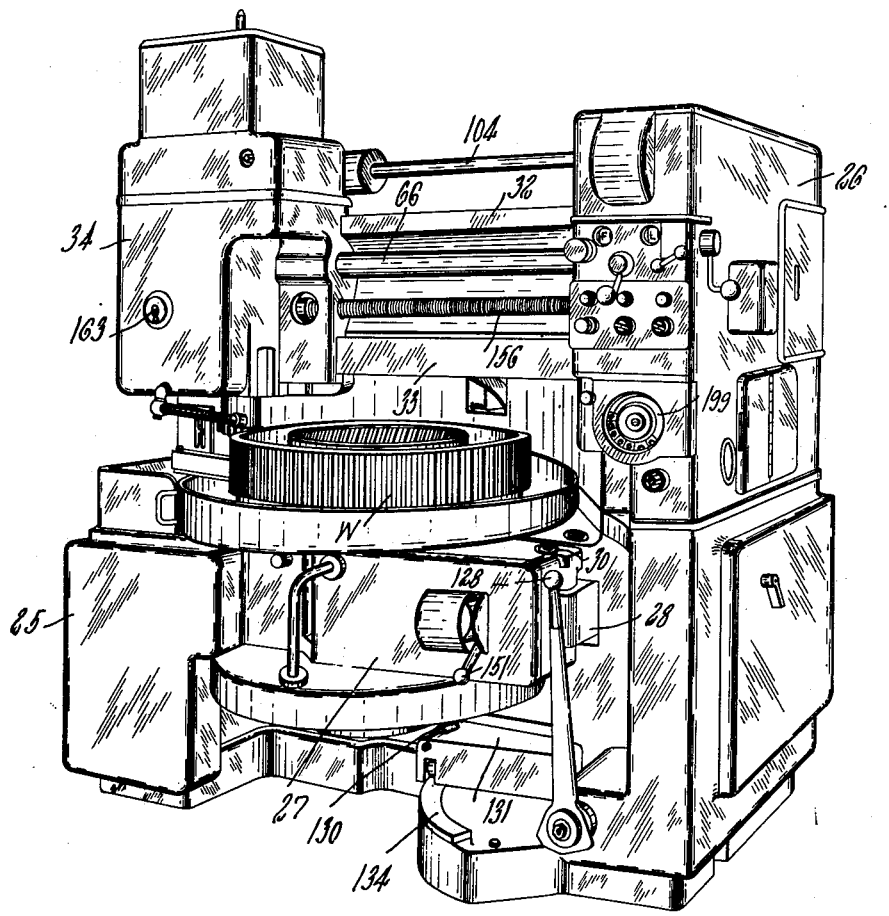
Fig. 1 is a perspective view showing the front and right hand side of the illustrative machine.

Figs. 15, 16, 17, 18 and 19 are detail sectional views taken on lines 15—15, 16—16, 17—17, 18—18 and 19—19, respectively, of Fig. 14;

Fig. 20 is a detail horizontal section taken on line 20—20 of Fig. 14;

Fig. 21 is a vertical sectional view as seen from the rear, of a timer and driving means therefor shown in Fig. 11;

Fig. 22 is a diagram of the mechanism, including speed changing transmissions, by which rotation is transmitted to the cutter and work spindle;

Fig. 23 is a diagram of the electrical system by which certain functions of the machine are controlled.

Like reference characters designate the same parts wherever they occur in all the figures.

The supporting structure includes a base 25 and a superstructure 26 mounted thereon. A work spindle apron 27 is coupled with the base by means of a link 28 (Fig. 7) and pivots 29 and 30, and rests on supporting means later described. A work spindle 31 is mounted rotatably in the apron 27 and is adapted to receive arbors, or other connecting means by which work pieces W of a wide variety of diameters and face widths may be secured to rotate with the spindle. Such work pieces may be blanks for either external or internal gears in which straight or helical teeth may be generated.

The superstructure includes horizontal guideways 32 and 33 on which a cutter spindle carriage, or cutter saddle, 34 is supported and movable linearly. In the embodiment here shown, the work spindle is vertically disposed and the guideways are horizontal.

In the carriage or saddle 34 a cutter spindle 35 (Fig. 3) is mounted with provision for rotation and axial reciprocation. Its axis is vertical and parallel with the work spindle axis. This spindle is adapted to carry a gear shaper cutter, of well known character, not here shown.

The means for reciprocating cutter spindle 35 consists of the following mechanism shown best in Figs. 3, 11, 13, 14 and 22. An electric motor 36, mounted in the interior of the base, drives, by means of sprockets 37 and 38 and a chain 39, a shaft 40. This shaft drives a parallel shaft 41 through a transmission gearing consisting of gears 42, 43, 44 and 45 fixed on shaft 40 and sliding gears 46, 47, 48 and 49 splined to the shaft 41. A third shaft 50 is driven by shaft 41 through any one of three gears 51, 52 and 53 (of which the gears 51 and 52 are connected together and splined on shaft 41, and gear 53 is fixed to that shaft), which are adapted to mesh respectively with connected sliding gears 54 and 55 splined to shaft 50, and a gear 56 which has a rotative bearing on shaft 50. Gear 55 carries an internal clutch 57 arranged to coact with an external clutch member secured to gear 56. Shaft 50 drives a crank shaft 58 by means of a pinion 59 and gear 60 fixed to these shafts respectively. A crank disk 61 is secured to the end of the crank shaft 58 adjacent to the outer wall of the machine base.

By means of the sliding gear transmissions here described, any one of twelve different speeds may be imparted to the crank shaft.

A crank pin 62 is mounted in a diametral guideway in the crank disk 61 and is adjustable radially by a screw 63. A pitman 64 having a screw threaded extension 64a is coupled to the crank pin 62 and its screw threaded portion is meshed with a gear element 65 keyed to a shaft 66 which extends between and in parallel with the guideways 32 and 33 and is supported at its ends in the superstructure. The pitman extension 64a is retained in mesh with gear 65 by a tubular guide 67 to which bearings 68 are connected surrounding shaft 66 on both sides of gear 65.

Figure 3:
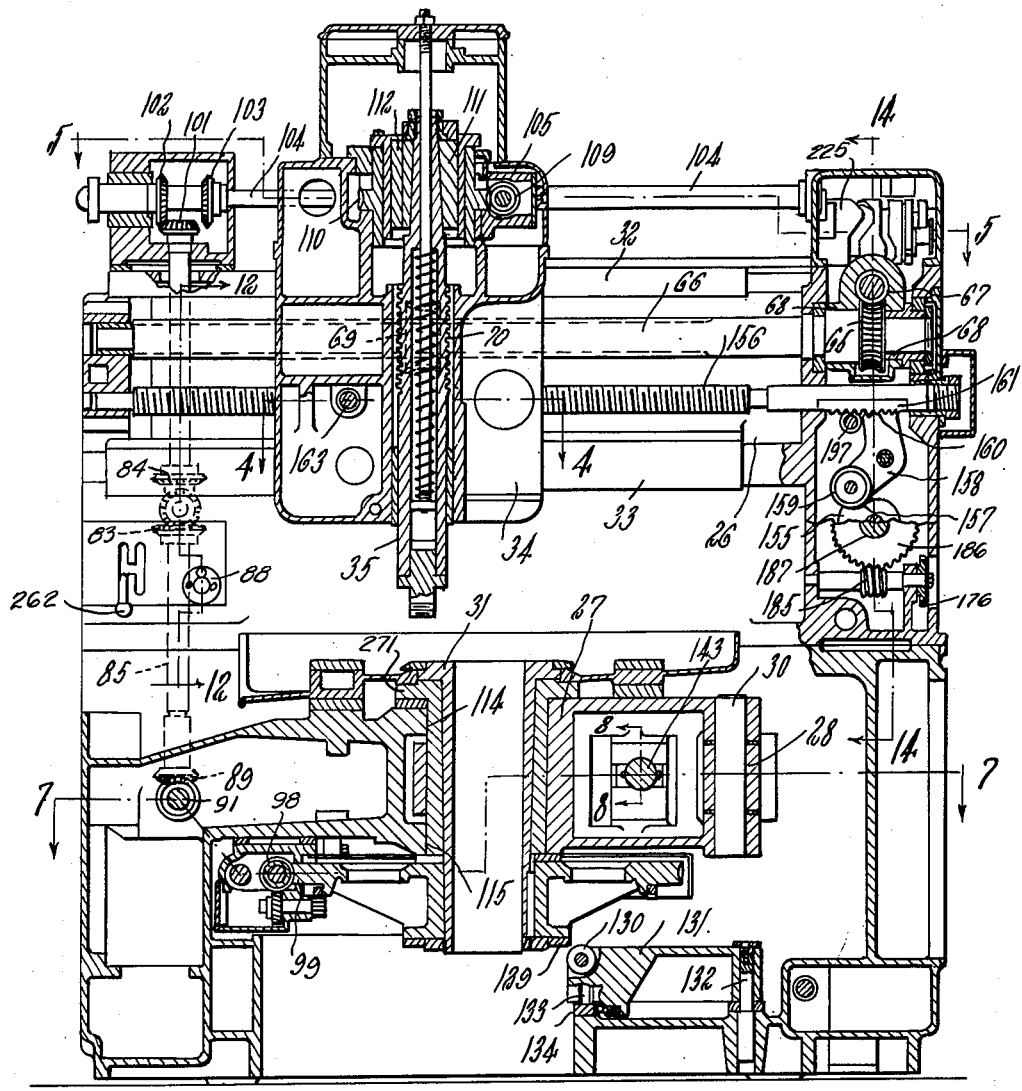
Fig. 3 is a vertical section on planes parallel to the front of the machine and represented by the line 3—3 of Figs. 5, 7 and 14.

Shaft 66 passes through the cutter carriage 34 and carries, in splined connection with it, a gear element 69, shown dotted in Fig. 3, which meshes with encircling rack teeth 70 on the cutter spindle 35.

The length of strokes of the cutter spindle may be altered by adjusting the crank pin 62 radially. The position of the spindle, and the points at which its strokes begin and end, may be adjusted, without changing the length of the strokes, by rotating the pitman extension 64a. This extension is provided with a shank portion 64b, which occupies a tubular bearing in the main body of the pitman and is retained therein by lock nuts 64c. Its outer end projects to near the front of the machine and carries a square portion 64d which is accessible for engagement by a wrench for turning it. Due to its thread, which meshes with the gear 65, rotation of the extension 64a shifts the spindle upwardly or downwardly as may be desired. The convolutions of the thread act as rack teeth to rotate gear 65 and shaft 66 when the pitman is moved endwise. The part of the pitman which contains shank 64b is split at one side, as shown in Fig. 15, and is fitted with a screw 71 by which it may be tightened on the shank to secure extension 64a in any rotated adjustment.

Figure 13:
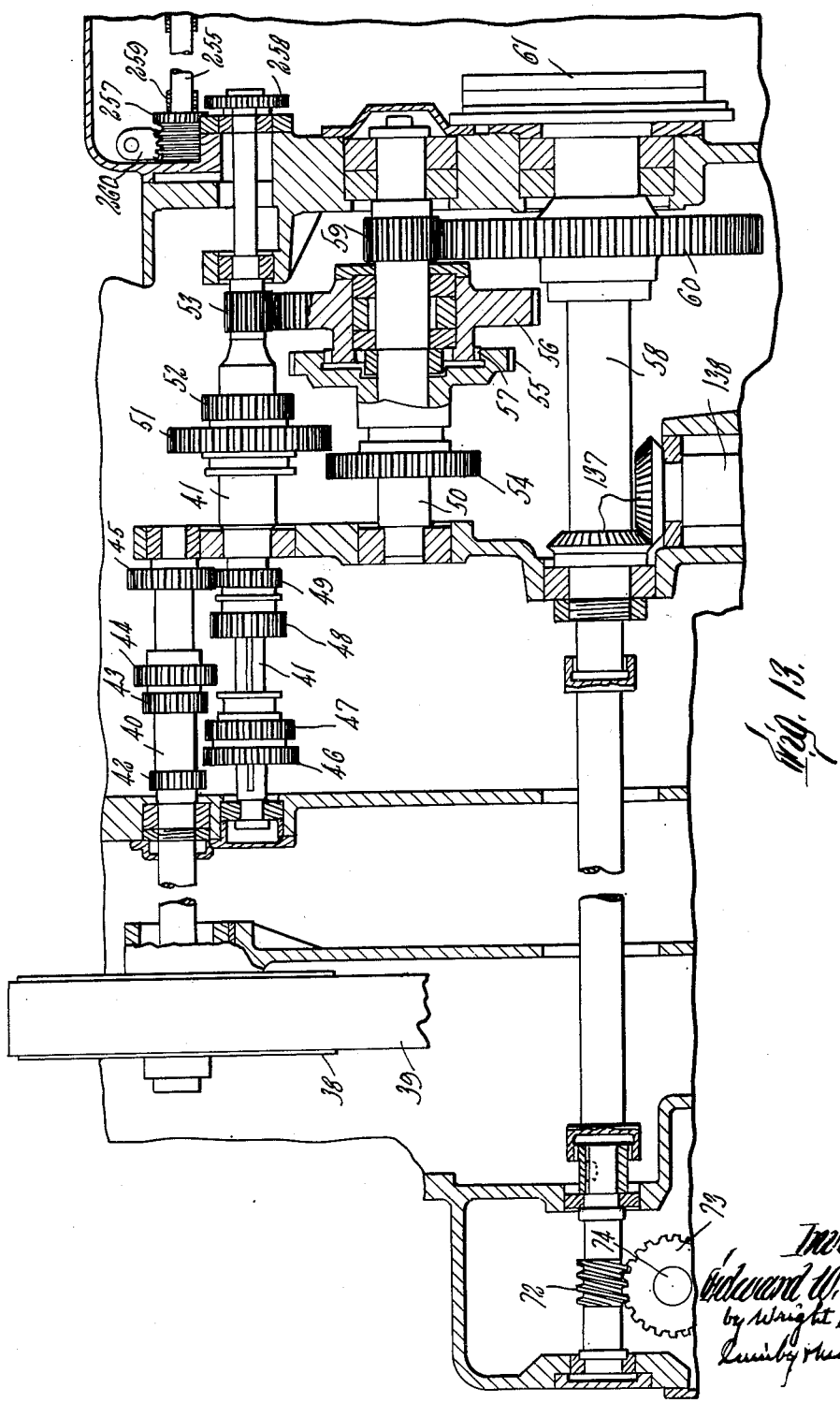
Fig. 13 is a sectional view taken on line 13—13 of Fig. 14 and resolved into a vertical plane.

The cutter and work spindles are rotated simultaneously by the crank shaft 58 through a worm 72 on the crank shaft at the opposite end thereof from the crank disk 61. Worm 72 meshes with a worm wheel 73 on a shaft 74 (Figs. 11, 12 and 13). This shaft carries one member 75 of a pair of changeable gears, the other member, 76, of which is mounted on an intermediate shaft 77, from which rotation is transmitted to a third shaft 78 through connected pairs of sliding gears 79 and 80 on shaft 77 and a cluster gear 81 on shaft 78. A bevel gear 82 on shaft 78 is adapted to be meshed with either of two connected bevel gears 83 and 84, which are located at diametrically opposite sides of the gear 82 and are splined to an upright shaft 85. Gears 83 and 84 are coupled with a shifter 86 in the form of a sleeve which surrounds shaft 85 and is adapted to be moved endwise by means of a pinion 87 meshing with rack teeth on the exterior of the sleeve and rotatable by a hand crank 88 on the shaft of the pinion, whereby either gear 83 or 84 may be put in mesh with gear 82.

By appropriately selected mesh of the sliding gears 79 and 80 with elements of the cluster gear 81, and appropriate setting of gears 83 and 84, any one of four different rotative speeds can be imparted to the shaft 85 in either direction.

The work spindle is rotated by shaft 85 through a bevel gear 89 on its lower end (Figs. 3 and 11), which meshes with a bevel gear 90 on a shaft 91 (Fig. 7), which, through a set of changeable gears 92, 93, 94, 95, 95' and 96 (see also Figs. 9 and 10), drives a shaft 97 carrying a worm 98 meshing with a worm wheel 99 secured to the work spindle 31 at the under side of the apron 27.

Shaft 85 transmits rotation to the cutter spindle from a bevel gear 101 on its upper end through either of two bevel gears 102 and 103 at opposite sides of its axis, which are splined to a shaft 104 (parallel to the cutter saddle guides) and are adapted to be shifted so as to bring either one into mesh with gear 101. A housing 105 (Fig. 5) is mounted in the cutter saddle 34 and is formed with a portion which surrounds the shaft 104. This housing contains a bevel gear 106 splined to shaft 104 and meshing with a bevel gear 107 which is secured to a shaft 108, rotatably mounted in the main part of the housing. A worm 109 is mounted on the shaft 108 and meshes with a worm wheel 110 which surrounds the cutter spindle 35 coaxially and transmits rotation to the spindle through guides 111 and 112 of the type customary in this part, which guides may have contact surfaces either parallel with the axis of the spindle or helicoidal, for causing the cutter to cut straight or helical teeth. According as one or the other of gears 102 and 103 meshes with gear 101, the cutter spindle is rotated in the same direction as the work spindle or in the opposite direction.

An important feature of the gearing between the shaft 104 and worm wheel 110 is that the housing 105 extends forwardly from the shaft 104 and is slidable with the cutter saddle 34 lengthwise of that shaft, and it is adjustable in the saddle so that the worm 109 can be brought into close and accurate mesh with the worm wheel 110 and adjusted to compensate for wear, without causing any distortion of the shaft 104. Shims 1051 (Fig. 5) of different thicknesses may be placed between the inner wall of the housing 105 and the structural web of the saddle 34 to which this housing is secured, in order to obtain exactly correct mesh between the worm and the wheel.

Another advantageous feature of this construction is that the worm 109 is at the same side of the worm wheel 110 as the zone of engagement between the cutter and a work piece on the work spindle. This gives an improved control of the cutter spindle.

The mounting of the work spindle apron by means of link 28 and pivots 29 and 30, as described, enables the apron to be withdrawn from its working position in the machine base and swung forwardly clear of the superstructure to permit changing of large and heavy work pieces. The end of the apron remote from that which is engaged with pivot 30 is contained in a recess in the base and held in close engagement with bearing points in the base, two of which are shown at 114 and 115 in Fig. 3 at the left of spindle 31. A flange 271 of the apron overlaps the adjacent part of the base which thus supports that part of the apron.

For moving the apron into and out of engagement with its bearing points in the base, a toggle mechanism is provided, which is shown in Fig. 11, and parts of which appear also in Figs. 1 and 7. A link 116 (which is adjustable in length) is coupled by means of ball and socket joints with a rearwardly extending arm 117 of the link 28 and with one arm of a bell crank lever 118, which is pivoted at 119 to the base structure. A toggle linkage is pivoted at 120 on the base and consists of links 121 and 122, connected together by a knuckle pivot 123. Link 122 is coupled at 124 with the second arm of the bell crank lever 118. The knuckle pivot 123 is connected by a link 125 with an arm 126 secured to a pivot shaft 127 which extends through the front wall of the base and on the outer end of which is secured a hand lever 128 (shown by full lines in Fig. 1 and dotted in Fig. 11).

When lever 128 is moved to the left (with respect to Fig. 11; to the right, Fig. 1), it causes the apron to be withdrawn from the bearing points 114, 115, until a bearing surface 129 on the lower end of the worm wheel 99 (Fig. 3) rides over and rests upon a roller 130 carried by a supporting piece 131 which is connected by a pivot 132 with the bass structure and carries a roller 133 in the under part of its free end which rests on an arcuate flat track 134 on the base (shown also in Fig. 1). Pivot 30 is then brought into alignment with pivot 132. The track 134 is concentric with pivot 132 and extends far enough to permit outward swinging movement of the apron, and a work piece connected with the work spindle, clear of the structure above.

A novel back off mechanism is provided for slightly retracting the apron from its bearing points 114, 115 when the cutter spindle makes its noncutting return strokes, and bringing it firmly against the bearing points when the working strokes take place. This mechanism is shown in Figs. 7, 8 and 11. It comprises a back off cam 135 secured to a shaft 136, which is driven from the crank shaft 58 by a pair of bevel gears 137, a shaft 138 and a coupling 139 between the shafts 136 and 138. It further comprises a lever 140 connected by a pivot 141 with the base structure and having an arm projecting toward the apron 27 carrying a gear segment 142 on its extremity. The teeth of this gear segment mesh with the teeth on the adjacent end of a block 143 which is mounted nonrotatably in the apron and is movable endwise toward and away from the gear segment 142.

The longer arm of lever 140, which projects rearward from its pivot 141, carries an extension 144 on which are mounted rolls 145 and 146 flanking the back off cam 135.

Back off cam 135 is rotated in one to one ratio with the crank shaft and has a low dwell and a high dwell, each extending around nearly 180° of its circumference, suitably disposed to shift and hold the apron in the prescribed positions while the cutter reciprocates. The extension 144 is connected to the lever 140 by a pivot 147 and clamp screw 148 and is adjustable angularly about the pivot 147, as may be needed to ensure a firm contact of the apron with bearing points 114, 115, by screws 149 mounted in portions of the lever 140 which embrace the extension 144.

In order that the apron may be withdrawn clear of the overhanging parts of the machine in the manner previously described, the intermeshing teeth of the back off lever and apron must be disengaged. The movable block 143 permits such disengagement. It is normally held in full mesh by means of a cam 150 to which a hand lever 151 is connected. This hand lever projects through a cover on the front of the base (Fig. 1) where it is accessible for manipulation by the operator. When in the position shown in the drawings, it holds the block 143 in mesh with the back off lever, but it may be turned until a low part 152 (Fig. 8) of the cam is brought adjacent to the outer end of the block, when a spring pressed pin 153, bearing against a flange 154 on the block, moves the latter outwardly far enough to bring its teeth out of mesh with the teeth of the back off lever.

Figure 4:
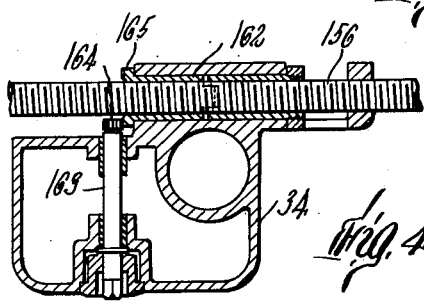
Fig. 4 is a detail horizontal section on line 4—4 of Fig. 3.

The cutter saddle 34 can be moved along the guides 32 and 33 to accommodate the cutter to external or internal gear blanks of any diameter within the working range of the machine, and it is automatically so moved for feeding the cutter to depth in a predetermined number of steps, and for withdrawing the cutter when the working circle is complete. A depth feed cam 155 and a lead screw 156 serve these purposes. The depth feed cam has a circumference of gradually increasing radius and a sharp drop at 157 between its highest and lowest points. It acts through a bell crank lever 158 having a roll 159 on one arm, which bears on the circumference of the cam, and a gear segment 160 on the other arm which engages the teeth of a rack 161 secured to one end of the lead screw 156. The lead screw is supported nonrotatably at its opposite ends in parallelism with the guides 32 and 33, and passes through a nut 162 (Fig. 4) carried by the cutter saddle 34, and with which the threads of the screw mesh. The nut can be rotated to propel the saddle in either direction, for setting it to correspond with different work pieces, by means of a shaft 163 carrying a pinion 164 in mesh with face gear teeth 165 on the end of the nut, and the outer end of which is accessible at the front of the machine for application of a wrench for rotating it.

The depth feed cam is rotated by mechanism, of which a part is shown in Fig. 3 and the major portion in Figs. 14, 17 and 18. Referring to Fig. 14, a cam 166 connected with the crank disk 61, is arranged to apply pressure to a roll 167 on one arm of a bell crank lever 168 pivoted at 169 to the base. The other arm of the bell crank is connected by a pivot 170 to an endwise movable rod 171 which carries a pawl 172 pivoted to its end remote from the bell crank 168. That end of rod 171 is connected to and supported by an arm 173 pivoted at 174 to the base. A spring 175, anchored on the base, is connected with the bell crank lever 168 in a manner to tend to hold roll 167 against cam 166 and withdraw rod 171 to the right from the position shown in the drawing.

Pawl 172 coacts with a ratchet wheel 176 to turn the ratchet when the pawl rod 171 is moved from right to left by the cam 166. An adjustable stop screw 177 is mounted in a fixed bracket 178 in position to engage arm 173 and limit the spring-retracted movement of the pawl to any amount between one tooth pitch of the ratchet wheel 176 and the full throw of the cam.

A lock lever 179 is pivoted at 180 (Fig. 20) to a part of the bracket 178 and is pressed upon by a spring 181 toward the bar 171 in a position such that a toe in its extremity will enter a notch 182 in the bar when the latter has been advanced by the full throw of cam 166. Fig. 14 shows the bar thus locked so that it cannot be retracted by spring 175 and hence is not capable of being moved by cam 166. A solenoid 183 is arranged so as, when energized, to withdraw the lock lever 179 and permit actuation of the pawl by the cam.

Ratchet 176 is mounted on a shaft 184 (Fig. 20), which carries a worm 185 meshing with a gear 186 rotatable about the shaft 187 on which the depth feed cam 155 is secured. Gear 186 carries a pawl 188 engaging a ratchet 189 keyed to shaft 187. This ratchet and pawl combination constitutes a one way clutch which transmits rotation from gear 186 to shaft 187 but permits the shaft and depth feed cam to be rotated ahead of the automatic drive by an externally accessible shaft 190 carrying a pinion 191 which meshes with a gear 192 fixed on shaft 187.

It will be apparent from the foregoing that the depth feed cam is rotated through a short step, which may be varied in length, with each rotation of the crank shaft, whenever the pawl and ratchet couple 172—176 is not put out of action by the lock or detent 179.

A constant force is applied to the lead screw 156 and through the rack 161 to hold the roll 159 against the depth feed cam, and cause this roll to enter the depression 157 of the cam, by means of a spring 193 (Fig. 14). This spring reacts against the stationary base structure of the machine and is connected with a chain 194 which passes around a sprocket 195 on a shaft 196 (Fig. 17), to which a pinion 197 is secured. This pinion meshes with the rack 161.

An important feature of the machine is automatic means by which the depth feed cam is operated to cause feeding of the cutter to full depth in the work piece in a series of steps, with pauses between successive steps while the work piece is rotated through a complete revolution or other predetermined angle. For this purpose a timer 198 (shown dotted in Fig. 11, and further shown in Fig. 21), is mounted in the base structure and a disk 199 (Figs. 14 and 19) is secured to the shaft 187. The timer has a rotatable member 200 (Fig. 21) for controlling contactors in the electrical system, which is rotated by a face gear 201 and pinion 202. This pinion is driven in time with the work spindle by a flexible shaft 203 which is connected with the shaft of the spindle-driving worm 98 (Fig. 7).

Figure 2:
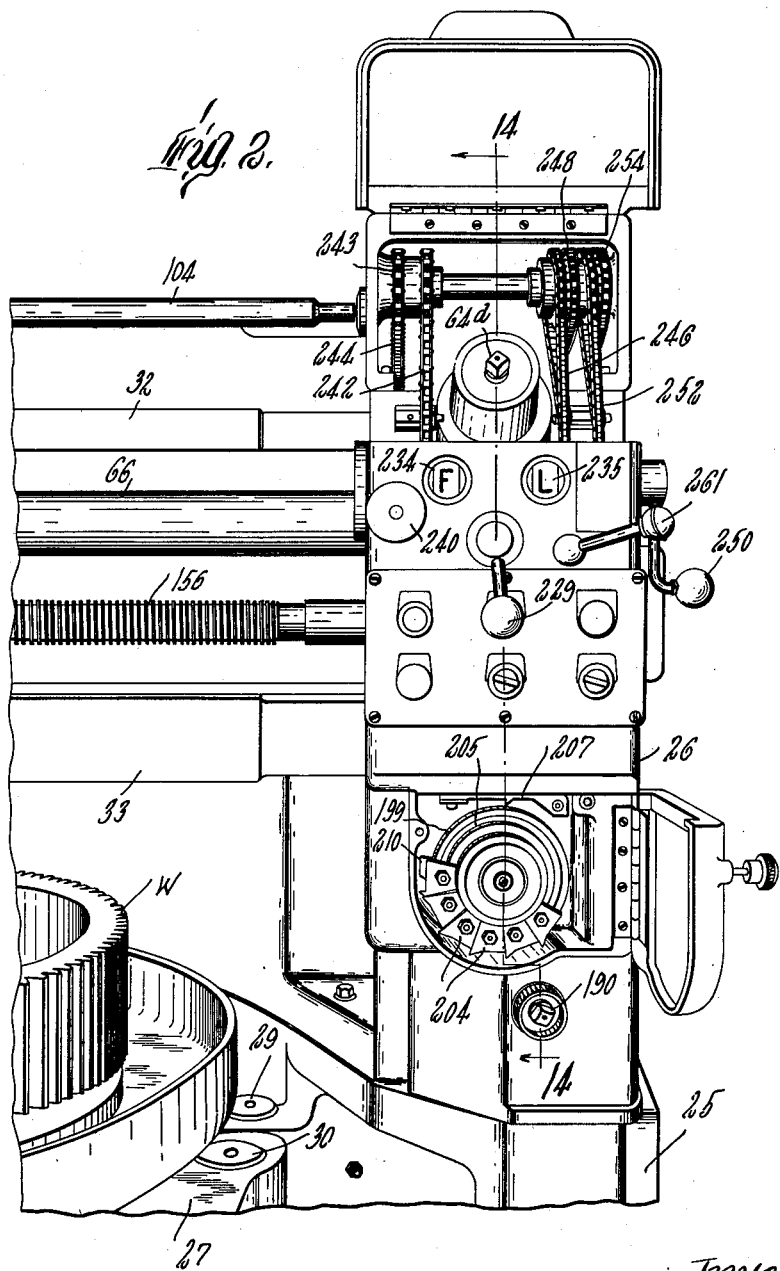
Fig. 2 is a front elevation of the upper part of the right hand end of the machine shown in Fig. 1.

Disk 199 carries on its outer face a number of circumferentially adjustable dogs 204 which are secured by bolts of which the heads lie in an undercut circular groove 205, in the outer face of the disk 199. Two such dogs (Fig. 19) or a much larger number of them (Fig. 2) may be mounted on the disk and adjusted at varying angular degrees apart around the axis of the disk. There is a degree scale 206 on the face of the disk by which the angular settings of the dogs may be determined.

These dogs act, in the course of rotation of the depth feed cam 155 and disk 199, to raise a lever 207 and thereby shift a switch 208 in the electrical system. Each dog has a sharp rise at one end and the lever has a sharp protuberance on its under side in the path of the dogs, whereby the displacement of the lever caused by the dogs is of limited duration and the release of the lever occurs suddenly.

The dog controlled switch 208 and the timer 198 are correlated in the electrical system to the following effect. The timer is geared to make an electrical contact after the work spindle gear 99 has made a complete rotation. This contact energizes the solenoid 183 and disengages the detent 179 from the pawl carrying bar 171, thereby enabling the ratchet wheel 176 to be rotated and to apply rotation to the depth feed cam and disk 199. When a dog 204 raises the switch 208 actuating lever 207, the switch controlled thereby causes the solenoid to be deenergized and the timer to be energized, whereby the detent 179 is caused to prevent further driving of the depth feed cam.

Disk 199 carries a nonadjustable dog 210 on its inner face which is angularly related to the depression 157 of the depth feed cam to displace a lever 211 (similar to lever 207) when the cam depression arrives at the position shown in Fig. 3 and thereby shifts a switch 212 in the electrical system which causes the machine to stop.

Figure 5:
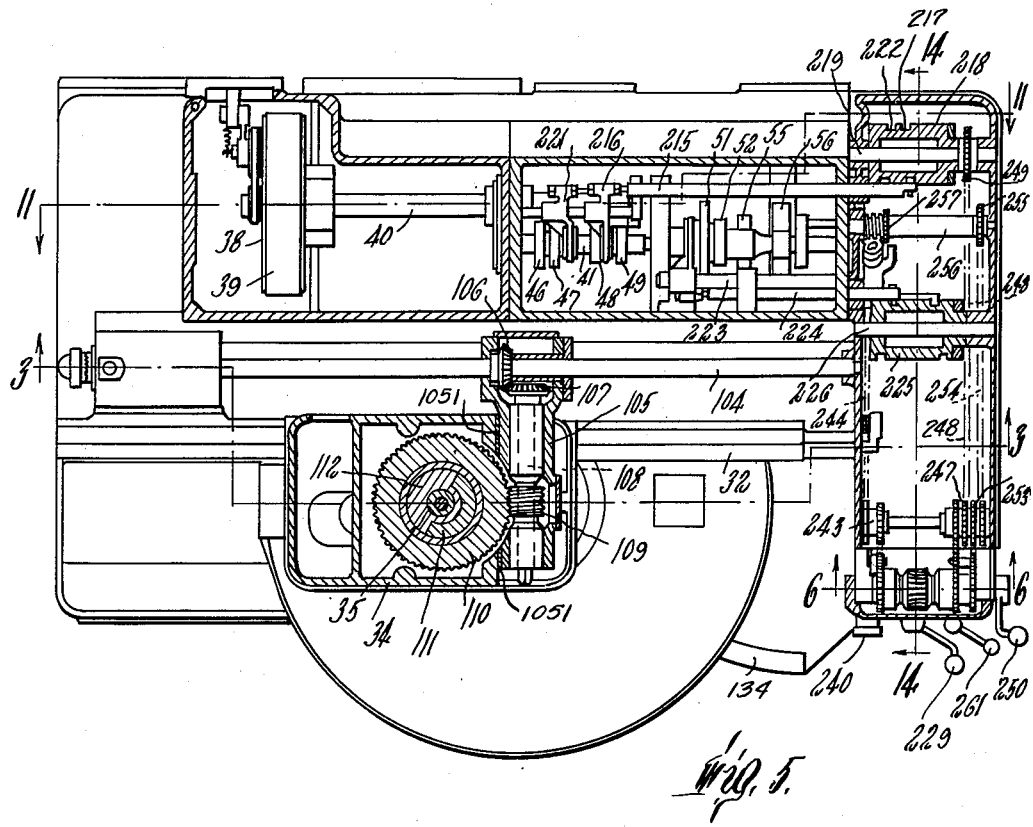
Fig. 5 is a horizontal section on line 5—5 of Fig. 3.

The sliding gears 46—49, 51, 52, 54, 55 in the driving train by which the cutter spindle is reciprocated are controlled and operated by manual means at the right hand end of the machine through mechanisms as follows. Referring to Figs. 5 and 11, a shifter bar 215 is connected at one end with a yoke 216 which engages the shiftable gear unit 48—49, and its other end carries a stud which enters a groove 217 in a cylindrical cam 218 which is rotatable on a shaft 219. A similar shifter bar 220 is connected by a yoke 221 with the gear unit 46—47 and with a second groove 222 in the cam 218.

Similar gear shifter bars 223 and 224 are coupled with the sliding gear units 51—52 and 54—55, respectively, and with separate encircling grooves in a cylindrical cam 225 which is rotatable on a pivot shaft 226. The cam grooves are formed with offsets, as shown in Fig. 11 with respect to the groove 222, and the cams are yieldingly held in their various positions by spring pressed balls 227 and 228 (Fig. 14), which enter notches in the circumferences of the cams.

Figure 6:
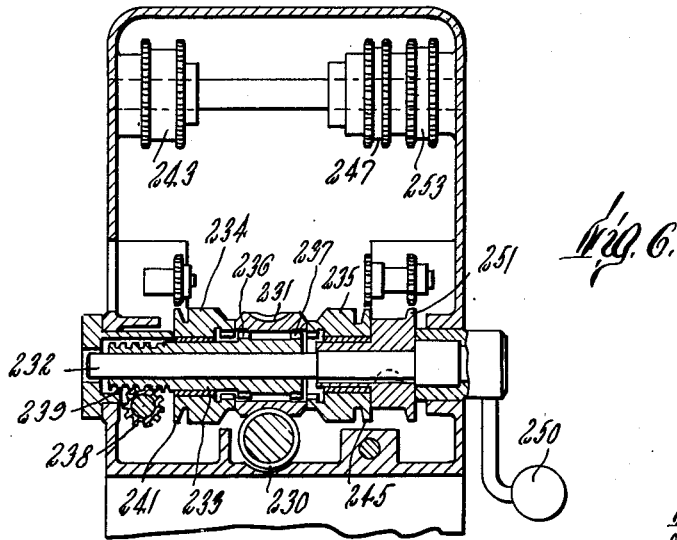
Fig. 6 is a detail vertical section taken on line 6—6 of Fig. 5 and shown on a larger scale.

The manual means for rotating the cams is a crank 229, shown in Figs. 1, 2, 5 and 14. It is connected with a worm 230 (Fig. 6) meshing with a worm wheel 231 which is rotatable about a shaft 232, being supported by a sleeve 233 which surrounds shaft 232 and is movable endwise thereon as well as being rotatable about the shaft. Cylindrical dials 234 and 235 are mounted rotatably at opposite sides of the worm gear 231 and are adapted to be coupled interchangeably to the latter by means of clutch elements 236 and 237 on the sleeve 233 which are in sliding clutched engagement with the worm gear. The clutch elements can be placed also in a neutral position, which is that shown in Fig. 6.

The clutch sleeve is placed in its various positions by means of a pinion 238 which meshes with encircling rack teeth 239 and is connected with a knob 240 at the front of the machine structure.

The dial 234 carries a sprocket element 241 which is connected by a chain 242 (Fig. 2) with one element of a double sprocket 243, the other element of which is connected by a chain 244 (Fig. 5) with a sprocket connected to the cam 225. Dial 235 carries a sprocket element 245 connected by a chain 246 with one element of a double sprocket 247, the other element of which is connected by a chain 248 with a sprocket 249 which is secured to cam 218.

Thus, by rotation of crank 229, with selective coupling of either dial 234 or 235 with the worm wheel 231, either cam 218 or 225 can be rotated and the various sliding gears selectively shifted to obtain any one of the total available number of reciprocation speeds of the cutter spindle. The dials 234 and 235 carry indicia (shown in Fig. 2 as letters) on their circumferences, which are visible through windows in the cover wall of the machine structure and serve to identify the positions of the sliding gears.

Shaft 232 can be rotated independently of the dials by means of a crank 250 so as to reciprocate the cutter spindle manually. For this purpose a sprocket 251 is keyed to the shaft and is coupled by a chain 252 with one element of a double sprocket 253, the other element of which is coupled by a chain 254 with a sprocket 255 on a shaft 256. A sliding gear 257 splined on this shaft is adapted to be brought into mesh with a gear 258 (Fig. 13) on the transmission shaft 41 of the spindle-reciprocating mechanism. Gear 257 is normally held out of mesh by a spring 259 and is brought into mesh at need by a shifter 260 operable by a lever 261 through connections not shown in these drawings.

The sliding gears 79 and 80 of the rotary feed transmission (shown in Fig. 12), are shiftable into various positions of mesh with the cluster gear 81 by a lever 262 at the left front of the machine structure which is movable through H slots into any of four different positions and operates gear shifters, one of which is shown at 263 in Fig. 11, through means shown by dotted lines. As such means are of conventional character, involving nothing novel in the present invention, it is considered unnecessary to show or describe them in detail.

It is to be understood that the invention which I claim is not limited to the specific details of means and mechanisms described in the foregoing specification, but that it embraces all equivalent means capable of accomplishing like and comparable results to those accomplished by the means herein described.

What I claim is:

1. In a gear shaping machine having a shiftable spindle carriage, a spindle mounted in said carriage to reciprocate endwise, a crank shaft, and means operated by said crank shaft for reciprocating said spindle, a cam rotatable in unison with said shaft, a depth feed cam disposed for applying force to said carriage so as to shift it linearly, mechanism operated by said first named cam for imparting step by step movement to the depth feed cam, an electrically controlled lock normally engaged with said mechanism to prevent transmission of rotation to the depth feed cam, a rotatable work spindle, a timer having a rotatable element driven in unison with said work spindle, means whereby said timer causes said lock to be released, whereby actuation of the depth feed cam is caused to take place, a dial rotatable simultaneously with the depth feed cam and means operated by said dial for activating and deactivating the timer.

2. A gear shaping machine comprising a supporting structure, rotatable work and cutter spindles, a carriage mounted on the supporting structure in which one of said spindles is contained with provision for axial reciprocation, a depth feed cam, transmission means between said cam and spindle carriage by which the cam in its rotation causes the carriage to be displaced, means for reciprocating the spindle in said carriage including a rotatable crank, a cam connected with said crank for rotation simultaneously therewith, a pawl device operable by the last named cam for back and forth reciprocation, a ratchet arranged to be rotated step by step by said pawl and geared to the depth feed cam so as to transmit rotation thereto, a lock organized to engage said pawl device so as to prevent movement thereof, a solenoid associated with said lock so as, when energized, to release the lock, means for rotating the cutter and work spindles simultaneously in a prescribed speed ratio, a timer including a movable element geared to the spindle rotating means for movement in timed relation therewith and having means for energizing the solenoid so as to release the lock, a dial associated for rotation in timed relation with the depth feed cam and electrical connections operated by said dial for deenergizing the solenoid and energizing the timer.

3. In a gear shaping machine, a cutter spindle, a work spindle, an apron in which one of said spindles is rotatably mounted, a holder in which the other spindle is rotatably and reciprocably mounted, means for rotating said spindles in a prescribed ratio, means for reciprocating the cutter spindle including a crank shaft, a back off lever for the apron having geared connection with the apron, and a back off cam in driven connection with said crank shaft organized to impart oscillating movement to said lever.

4. A gear shaping machine according to claim 3, in which the back off lever is provided with a gear segment adjacent to the apron and the apron is provided with a shiftable block having teeth in mesh with said gear segment, said block being retractable from the back off lever to disengage its teeth from the teeth of the gear segment, whereby to permit displacement of the apron from its operative position in the machine.

5. In a gear shaping machine, a supporting structure, a work spindle apron mounted on said structure, a work spindle rotatably held by said apron, mechanism normally holding the apron in working position with respect to the base but operable to shift the apron away from the base, a back off mechanism for the apron including a mechanically oscillated lever having a gear segment and a toothed block mounted on the apron in mesh with said segment, said block being disengageable from the gear segment to permit retraction of the apron.

6. In a gear shaping machine, a supporting structure, a work spindle apron mounted thereon and movable linearly and angularly from its operating position, and a pivotally mounted supporter for said apron arranged to receive the apron when retracted linearly from its operating position and being rotatable about its pivot when the apron is supported upon it so as to enable the apron to be swung in a manner to carry the work spindle away from the supporting structure.

7. In a gear shaping machine including a supporting structure, a spindle carriage movable on said structure in a straight path, and a spindle rotatably mounted in said carriage, means for rotating the spindle including a shaft parallel with the carriage path, a housing movable lengthwise of said shaft and connected with said carriage, a shaft contained in said housing extending away from the first named shaft, intermeshing gears contained in said housing and mounted on the respective shafts, and intermeshing gear elements on the second shaft and the spindle, respectively, arranged to transmit rotation to the spindle.

8. A gear shaping machine including a supporting structure, cutter and work spindles mounted on said structure for rotation about their respective axes, one of said spindles being reciprocable endwise, and mechanism for reciprocating the last named spindle comprising a shaft, a plurality of gears secured to said shaft with spaces between them, a second shaft parallel to the before named shaft, sliding gears splined to the second shaft displaceable into mesh exclusively with different ones of the gears on the first named shaft, a crank driven by the second shaft, and connections between said crank and the endwise movable spindle for imparting endwise reciprocation to the spindle.

9. A gear shaping machine according to claim 8 combined with means for shifting the shiftable gears, which comprises a cam, and a gear shifter coupled with said sliding gear and engaged with the cam.

10. A gear shaping machine according to claim 8 combined with means for shifting the slidable gears on the second named shaft, which includes a cam, a gear shifter coupled with said sliding gear and engaged with the cam in a manner such that rotation of the cam moves the sliding gears axially, a rotatable sprocket adapted to be rotated by the machine operator, and a transmission chain between said sprocket and cam.

11. In a gear shaping machine, a shiftable spindle carriage, a spindle mounted in said carriage to reciprocate endwise, means to reciprocate said spindle in said carriage, a cam moveable in unison with said reciprocating means, a depth feed cam connected to said carriage so as to shift it linearly, mechanism operated by said first-named cam for imparting step by step movement to the depth feed cam, a lock normally engaged with said mechanism to prevent rotation of said depth feed cam, a second spindle, means to rotate said second spindle, a timer having an element driven in unison with said second spindle and means whereby said timer causes said lock to be released whereby actuation of the depth feed cam is caused to take place.

12. In a gear shaping machine having a shiftable spindle carriage, a spindle mounted in said carriage to reciprocate endwise, means to reciprocate said spindle in said carriage, a cam moveable in unison with said reciprocating means, a depth feed cam connected to said carriage so as to shift it linearly, mechanism operated by said first-named cam for imparting step by step movement to the depth feed cam, a lock normally engaged with said mechanism to prevent rotation of said depth feed cam, a second spindle, means to rotate said second spindle, a timer having an element driven in unison with said second spindle, means whereby said timer causes said lock to be released whereby actuation of the depth feed cam is caused to take place, a dial moveable simultaneously with said depth feed cam, and means operated by said dial to activate and deactivate said timer.

EDWARD W. MILLER.

References Cited in the file of this patent

UNITED STATES PATENTS

| Number | Name | Date |
|---|---|---|
| 1,231,255 | Hanson | June 26, 1917 |
| 1,490,894 | Einstein | Apr. 15, 1924 |
| 1,961,396 | Schmitt et al. | June 5, 1934 |
| 2,068,889 | Roehm et al. | Jan. 26, 1937 |
| 2,103,911 | Miller | Dec. 28, 1937 |
| 2,125,304 | Miller | Aug. 2, 1938 |
| 2,126,339 | Miller | Aug. 9, 1938 |
| 2,306,910 | Sykes | Dec. 29, 1942 |
| 2,435,405 | Praeg | Feb. 3, 1948 |